United States Patent
Bharadwaj et al.

(10) Patent No.: US 10,178,544 B2
(45) Date of Patent: Jan. 8, 2019

(54) OBTAINING MULTIPLE SUBSCRIPTION SERVICES FROM AN EMBEDDED UNIVERSAL INTEGRATED CIRCUIT CARD

(71) Applicant: QUALCOMM Incorporated, San Diego, CA (US)

(72) Inventors: Sridhar Bharadwaj, Bengaluru (IN); Phani Pradeep Kumar Kothapalli Venkata, Hyderabad (IN); VijayaKumar Reddy, Hyderabad (IN); Shruti Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/379,741

(22) Filed: Dec. 15, 2016

(65) Prior Publication Data

US 2018/0176765 A1    Jun. 21, 2018

(51) Int. Cl.
*H04W 8/18* (2009.01)
*H04W 68/00* (2009.01)
*H04W 8/20* (2009.01)
*H04L 29/08* (2006.01)

(52) U.S. Cl.
CPC ......... *H04W 8/183* (2013.01); *H04L 67/2842* (2013.01); *H04L 67/30* (2013.01); *H04W 8/205* (2013.01); *H04W 68/00* (2013.01)

(58) Field of Classification Search
CPC ............ H04B 1/3816; H04M 2250/14; H04W 8/183; H04L 67/2842; H04L 67/30
See application file for complete search history.

(56) References Cited

U.S. PATENT DOCUMENTS

| | | | | |
|---|---|---|---|---|
| 9,531,831 | B1* | 12/2016 | Cuadrat | H04L 67/303 |
| 9,603,189 | B2* | 3/2017 | Holtmanns | H04W 8/205 |
| 9,668,122 | B2* | 5/2017 | Petersson | H04W 8/183 |
| 2014/0087790 | A1* | 3/2014 | Babbage | H04W 8/183 |
| | | | | 455/558 |

(Continued)

FOREIGN PATENT DOCUMENTS

GB    2485433 A    5/2012

OTHER PUBLICATIONS

International Search Report and Written Opinion—PCT/US2017/061941—ISA/EPO—dated Mar. 8, 2018.

(Continued)

*Primary Examiner* — Lewis West
(74) *Attorney, Agent, or Firm* — The Marbury Law Group (57) ABSTRACT

Methods for obtaining network services on a mobile communication device may include attaching the mobile communication device to a first network associated with a first subscription supported by a first profile stored on an embedded universal integrated circuit card (eUICC) on the mobile communication device, caching, in memory on the mobile communication device, the first profile corresponding to the first subscription, deactivating the first subscription of the eUICC on the mobile communication device without detaching from the first network, caching, in memory on the mobile communication device, a second profile stored on the eUICC corresponding to a second subscription, activating the first subscription of the eUICC, and monitoring for paging indicators directed to the second subscription utilizing the cached second profile.

44 Claims, 5 Drawing Sheets

(56) References Cited

U.S. PATENT DOCUMENTS

| | | | |
|---|---|---|---|
| 2014/0220952 A1* | 8/2014 | Holtmanns | H04W 8/183 |
| | | | 455/418 |
| 2014/0308991 A1 | 10/2014 | Lee et al. | |
| 2015/0350881 A1* | 12/2015 | Weiss | H04W 4/001 |
| | | | 455/558 |
| 2015/0373778 A1* | 12/2015 | Holtmanns | H04W 8/205 |
| | | | 455/558 |
| 2015/0382178 A1 | 12/2015 | Park et al. | |
| 2016/0316372 A1* | 10/2016 | Daksiewicz | H04W 12/08 |
| 2016/0373920 A1* | 12/2016 | Petersson | G06F 21/34 |
| 2017/0034705 A1* | 2/2017 | Stocker | H04W 4/005 |
| 2017/0048773 A1* | 2/2017 | Miao | H04W 8/183 |
| 2017/0070877 A1* | 3/2017 | Shi | H04W 8/183 |
| 2017/0127217 A1* | 5/2017 | Miao | H04W 4/003 |

OTHER PUBLICATIONS

V1 et al., "GSM Association Non-confidential Official Document 12FAST.13—Embedded SIM Remote Provisioning Architecture Embedded SIM Remote Provisioning Architecture Security Classification: Non-confidential Remote Provisioning Architecture for Embedded UICC GSM Association", Dec. 17, 2013, XP055218410, Retrieved from the Internet: URL:http://www.gsma.com/connectedliving/wp-content/uploads/2014/01/1.-GSMA-Embedded-SIM-Remote-Provisioning-Architecture-Version-1.1.pdf, pp. 1-84.

\* cited by examiner

OBTAINING MULTIPLE SUBSCRIPTION SERVICES FROM AN EMBEDDED UNIVERSAL INTEGRATED CIRCUIT CARD

BACKGROUND

Some designs of mobile communication devices—such as smart phones, tablet computers, and laptop computers—contain an embedded Universal Integrated Circuit Card (eUICC), multiple Universal Integrated Circuit Cards (UICCs), or multiple Subscriber Identity Module (SIM) cards that store user identity information for multiple subscriptions that enable users to access multiple separate mobile telephony networks. eUICC is the name given to a UICC capable of supporting remote provisioning of network subscription information. An eUICC may be removable or implemented within memory of mobile communication devices.

The information stored in an eUICC may enable mobile communication devices to communicate with a variety of different types of mobile telephony networks. Examples of mobile telephony networks include Third Generation (3G), Fourth Generation (4G), Long Term Evolution (LTE), Time Division Multiple Access (TDMA), Code Division Multiple Access (CDMA), CDMA 2000, Wideband CDMA (WCDMA), Global System for Mobile Communications (GSM), Single-Carrier Radio Transmission Technology (1×RTT), and Universal Mobile Telecommunications Systems (UMTS). Each subscription enabled by an eUICC or SIM may utilize a particular radio access technology (RAT) to communicate with its respective network.

SUMMARY

Various embodiments of methods for obtaining network services on a mobile communication device may include attaching the mobile communication device to a first network associated with a first subscription supported by a first profile stored on an embedded universal integrated circuit card (eUICC) on the mobile communication device, caching, in memory on the mobile communication device, the first profile corresponding to a first subscription, deactivating the first subscription of the eUICC on the mobile communication device without detaching from the first network, caching, in memory on the mobile communication device, a second profile stored on the eUICC corresponding to a second subscription, activating the first subscription of the eUICC, and monitoring for paging indicators directed to the second subscription of the eUICC utilizing the cached second profile.

Some embodiments may further include determining whether a call is going to occur on the second subscription based on the paging indicators, and activating the second subscription of the eUICC for a duration of the call in response to determining that a call is going to occur on the second subscription. Some embodiments may further include activating the first subscription of the eUICC after the call ends. In some embodiments, the first subscription is not detached from a first network when activating the second subscription of the eUICC. In some embodiments, determining whether a call is going to occur on the second subscription may be further based on whether a user has initiated a call on the second subscription.

Some embodiments may further include attaching the mobile communication device to a second network associated with the second subscription. Some embodiments may further include determining whether a user has activated the second subscription or enabled data on the second subscription, and activating the second subscription of the eUICC in response to determining that the user has activated the second subscription or enabled data on the second subscription. In some embodiments, the first subscription may be a designated data subscription.

In some embodiments, the second subscription may not be detached from a second network when activating the first subscription of the eUICC. In some embodiments, the first profile and the second profile may be cached in a local memory on the mobile communication device. In some embodiments, monitoring for paging indicators directed to the second subscription utilizing the cached second profile may include receiving and decoding the paging indicators utilizing the cached second profile.

Further embodiments include a mobile communication device including a memory, a radio frequency (RF) resource, and a processor configured to perform operations of the methods summarized above. Further embodiments include a non-transitory processor-readable storage medium having stored thereon processor-executable software instructions configured to cause a processor of a mobile communication device to perform operations of the methods summarized above. Further embodiments include a mobile communication device that includes means for performing functions of the operations of the methods summarized above.

BRIEF DESCRIPTION OF THE DRAWINGS

The accompanying drawings, which are incorporated herein and constitute part of this specification, illustrate examples, and together with the general description given above and the detailed description given below, serve to explain the features of the disclosed systems and methods.

DETAILED DESCRIPTION

Various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "mobile communication device" refers to any one or all of cellular telephones, smart phones, personal or mobile multi-media players, personal data assistants, laptop computers, tablet computers, smart books, smart watches, palm-top computers, wireless electronic mail receivers, multimedia Internet-enabled cellular telephones, wireless gaming controllers, and similar personal electronic devices that includes an eUICC or one or more SIM modules (e.g., SIM cards), a programmable processor, memory, and circuitry for connecting to at least two mobile communication network with one or more shared radio frequency (RF) resources. Various examples may be useful in mobile communication devices, such as smart phones, and so such devices are referred to in the descriptions of various examples. However, the examples may be useful in any electronic devices that may individually maintain a plurality of subscriptions that utilize at least one shared RF chain, which may include one or more of antennae, radios, transceivers, etc.

As used herein, the terms "eUICC," "UICC" "SIM module," "SIM card," and "subscriber identification module" are used interchangeably to refer to a memory module that may be an integrated circuit or embedded into a removable card, and that stores an International Mobile Subscriber Identity (IMSI), related key, and/or other information used to identify and/or authenticate a mobile communication device on a network and enable a communication service with the network. All GSM, UMTS, and LTE network mobile phone users have a unique identification associated with them known as an IMSI. Because the information stored in an eUICC or SIM enables the mobile communication device to establish a communication link for a particular communication service with a particular network, the term "subscription" is used herein as a shorthand reference to refer to the communication service associated with and enabled by the information stored in a particular eUICC or SIM as the eUICC or SIM and the communication network, as well as the services and subscriptions supported by that network, correlate to one another.

In the following descriptions of various examples, references are made to a first subscription and a second subscription. The references to the first and second subscriptions are arbitrary and are used merely for the purposes of distinguishing one subscription from the other in the various examples. The device processor may assign any indicator, name, or other designation to differentiate the subscriptions on the mobile communication device.

An eUICC is the equivalent of a SIM card that is implemented in memory and supports the downloading and installation of multiple mobile network operator profiles, or subscription profiles, in its secure domain. Thus, a single eUICC may support more than one subscription, unlike traditional SIM cards that each support one subscription at a time. Further, users may upload subscription identifying information to an eUICC to add a subscription instead of replacing a physical SIM card. The eUICC allows a user to manage the profiles on the card, such as enabling profiles, disabling profiles, deleting profiles, resetting the memory of the eUICC (e.g., to delete all profiles), querying the list of profiles, and nicknaming of profiles.

An eUICC allows one profile to be enabled at any time. If a user wants to activate or enable another subscription profile, the active subscription is deactivated first by performing a detach procedure between the active subscription and its respective network, and then the new subscription is activated by performing an attach procedure with its respective network. Thus, while the eUICC may support more than one subscription, the subscriptions cannot be simultaneously active on the eUICC. During the detach and attach procedure for switching subscriptions the user may not be able to utilize any subscription, and thus may not place or receive calls. The detach and attach procedure for switching subscriptions may take a long time from the perspective of a user eager to place or receive a call.

To shorten the time required to switch subscriptions and improve the user experience, the various examples include methods implemented with a processor of a mobile communication device for obtaining service with an eUICC by caching subscription profiles in memory on the mobile communication device. Example methods enable a mobile communication device avoid detaching from a first subscription when switching to a second subscription. The mobile communication device may not perform a detach procedure when switching between subscriptions, so the network for each subscription does not know that the subscription is not active and may continue to send paging notifications for the subscription. This enables transitions between subscriptions to be performed faster than conventional methods.

On startup, the mobile communication device may perform an attach procedure for each subscription supported on the eUICC and cache the profile for each subscription in local memory on the mobile communication device (i.e., store all or part of the profile located in the eUICC in memory of the mobile communication device). The mobile communication device may activate a first subscription of the eUICC, for example the designated data subscription (DDS). The mobile communication device may also monitor for pages from the network associated with the second subscription using the cached profile for the second subscription. The mobile communication device may detect when a call is going to occur on the second subscription, such as by receiving a paging indicator of an incoming call or detecting a user input indicate the intent to place an outgoing call via the second subscription. If a call is going to occur, the mobile communication device may activate the second subscription of the eUICC without performing a detach procedure for the first subscription. After the call ends on the second subscription ends, the mobile communication device may reactivate the first subscription of the eUICC without detaching the second subscription. By not detaching from networks regardless of which subscription is active and using locally cached profiles for each subscription, the mobile communication may monitor pages for multiple subscriptions and quickly switch between multiple subscriptions when a call is going to occur. This enables multi-subscription service using a single eUICC and a shared RF resource. In addition, space is saved on the mobile communication device by using one eUICC instead of multiple SIM cards, and switching of SIM cards when traveling to other countries is avoided.

Figure 1:
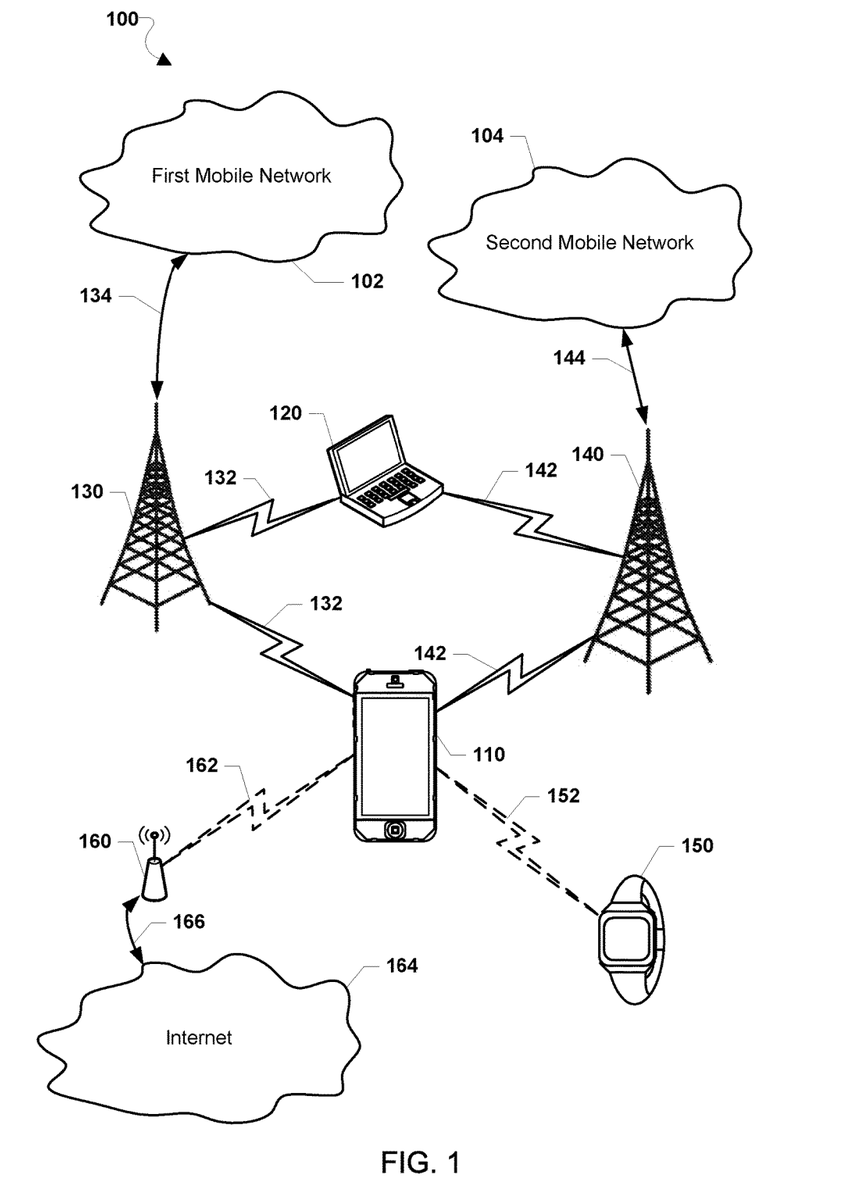
FIG. 1 is a communication system block diagram of mobile telephony networks suitable for use with various examples.

Various examples may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as 4G LTE, 3G, CDMA, TDMA, WCDMA, GSM, and other mobile telephony communication technologies.

While the mobile communication devices 110, 120 are shown connected to the first mobile network 102 and, optionally, to the second mobile network 104, in some examples (not shown), the mobile communication devices 110, 120 may include two or more subscriptions to two or more mobile networks and may connect to those subscriptions in a manner similar to those described above.

In some examples, the first mobile communication device 110 may optionally establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some examples, the first mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
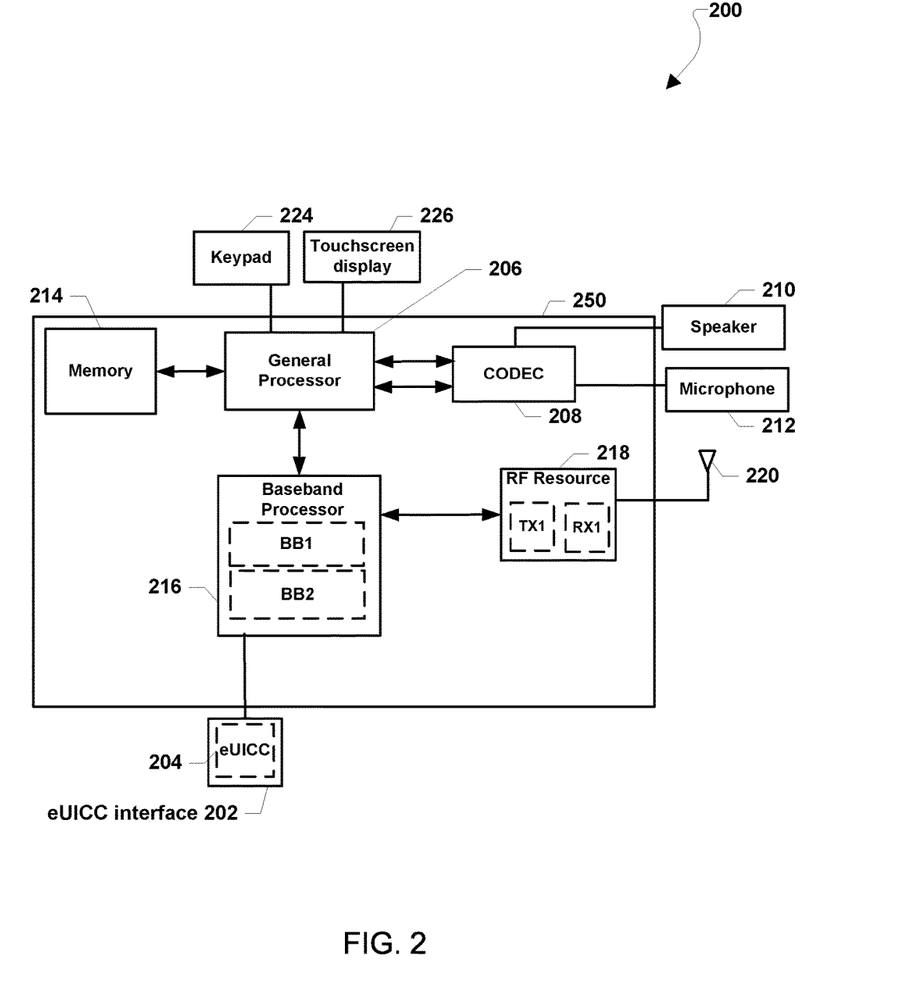
FIG. 2 is a component block diagram of a mobile communication device according to various examples.

FIG. 2 is a functional block diagram of a mobile communication device 200 suitable for implementing various examples. The mobile communication device 200 may be similar to one or more of the mobile communication devices 110, 120 as described. The mobile communication device 200 may include an eUICC interface 202, which may receive an eUICC 204 that stores profiles associated with two or more subscriptions.

An eUICC in various examples may be configured with SIM and/or Universal SIM applications, enabling access to, for example, GSM, and/or UMTS networks. The eUICC may also provide storage for a phone book and other applications. Alternatively, in a CDMA network, the eUICC may include removable user identity module (R-UIM) or a CDMA subscriber identity module (CSIM) on a card. An eUICC may have a CPU, ROM, RAM, EEPROM and I/O circuits.

An eUICC used in various examples may contain user account information, an international mobile subscriber identity (IMSI), a set of SIM application toolkit (SAT) commands, and storage space for phone book contacts. An eUICC may further store home identifiers (e.g., a System Identification Number (SID)/Network Identification Number (NID) pair, a Home PLMN (HPLMN) code, etc.) to indicate the network operator providers for each subscription of the eUICC. An Integrated Circuit Card Identity (ICCID) SIM serial number may be printed on the eUICC for identification. However, an eUICC may be implemented within a portion of memory of the mobile communication device 200 (e.g., in a memory 214), and thus need not be a separate or removable circuit, chip, or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. The memory 214 may store an operating system (OS), as well as user application software and executable instructions. The memory 214 may also store locally cached profiles for subscriptions supported by the eUICC 204.

The general processor 206 and the memory 214 may each be coupled to at least one baseband modem processor 216. The eUICC 204 in the mobile communication device 200 may utilize one or more baseband-RF resources. A baseband-RF resource may include the baseband modem processor 216, which may perform baseband/modem functions for communications with and controlling of a RAT. The baseband-RF resource may include one or more amplifiers and radios, referred to generally herein as RF resources (e.g., RF resource 218). In some examples, baseband-RF resources may share the baseband modem processor 216 (i.e., a single device that performs baseband/modem functions for all RATs on the mobile communication device 200). In other examples, each baseband-RF resource may include physically or logically separate baseband processors (e.g., BB1, BB2).

The RF resource 218 may be a transceiver that performs transmit/receive functions for the eUICC 204 on the mobile communication device 200. The RF resource 218 may include separate transmit and receive circuitry, or may include a transceiver that combines transmitter and receiver functions. In some examples, the RF resource 218 may include multiple receive circuits. The RF resource 218 may be coupled to a wireless antenna (e.g., a wireless antenna 220). The RF resource 218 may also be coupled to the baseband modem processor 216.

In some examples, the general processor 206, the memory 214, the baseband processor(s) 216, and the RF resource 218 may be included in the mobile communication device 200 as a system-on-chip 250. In some examples, the eUICC 204 and its corresponding eUICC interface 202 may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a user selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the eUICC 204, the baseband processor BB1, BB2, the RF resource 218, and the wireless antenna 220 may constitute two or more radio access technologies (RATs). For example, the mobile communication device 200 may be a communication device that includes an eUICC, baseband processor, and RF resource configured to support two different RATs, such as LTE and GSM. More RATs may be supported on the mobile communication device 200 by adding more RF resources, and antennae for connecting to additional mobile networks.

In some examples (not shown), the mobile communication device 200 may include, among other things, additional eUICC or SIM cards, eUICC or SIM interfaces, a plurality of RF resources associated with the additional eUICC or SIM cards, and additional antennae for supporting subscriptions communications with additional mobile networks.

Figure 3:
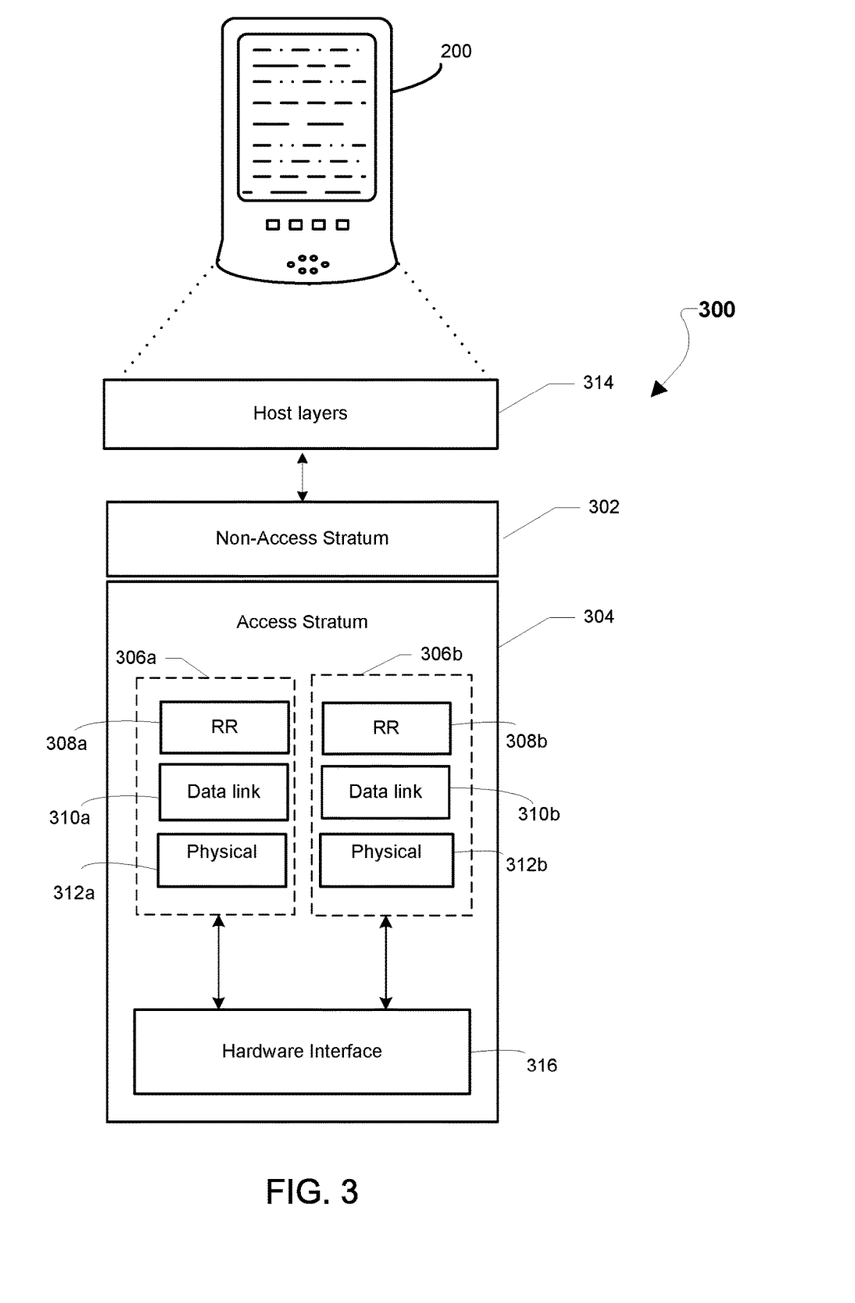
FIG. 3 is a system architecture diagram illustrating example protocol layer stacks implemented by the wireless communication device illustrated in FIG. 2.

FIG. 3 illustrates an example of a software architecture with layered radio protocol stacks that may be used in data communications on a mobile communication device. Referring to FIGS. 1-3, the mobile communication device 200 may have a layered software architecture 300 to communicate over access networks associated with one or more eUICCs or SIMs. The software architecture 300 may be distributed among one or more processors, such as the baseband-modem processor 216.

The software architecture 300 may include a Non Access Stratum (NAS) 302 and an Access Stratum (AS) 304. The NAS 302 may include functions and protocols to support traffic and signaling for the one or more eUICCs or SIMs on the mobile communication device 200 (e.g., eUICC 204) and their respective core networks. The AS 304 may include functions and protocols that support communication between each eUICC or SIM (e.g., the eUICC 204) and entities of their respective access networks (e.g., a mobile switching center (MSC) in a GSM network, eNodeB in an LTE network, etc.).

In the mobile communication device 200, the AS 304 may include multiple protocol stacks, each of which may be associated with a different eUICC or SIM. For example, the AS 304 may include protocol stacks 306a, 306b, associated with a first eUICC subscription or SIM and a second eUICC subscription or SIM, respectively. Although described below with reference to GSM-type communication layers, protocol stacks 306a, 306b may support any of variety of standards and protocols for wireless communications. In particular, the AS 304 may include at least three layers, each of which may contain various sublayers. For example, each protocol stack 306a, 306b may respectively include a Radio Resource (RR) sublayer 308a, 308b as part of Layer 3 (L3) of the AS 304 in a GSM or LTE signaling protocol. The RR sublayers 308a, 308b may oversee the establishment of a link between the mobile communication device 200 and associated access networks.

In the various embodiments, the NAS 302 and RR sublayers 308a, 308b may perform the various functions to search for wireless networks and to establish, maintain and terminate calls. Further, the RR sublayers 308a, 308b may provide functions including broadcasting system information, paging, and establishing and releasing a radio resource control (RRC) signaling connection between the mobile communication device 200 and the associated access network.

While not shown, the software architecture 300 may include additional Layer 3 sublayers, as well as various upper layers above Layer 3. Additional sub-layers may include, for example, connection management (CM) sublayers (not shown) that route calls, select a service type, prioritize data, perform QoS functions, etc.

Residing below the Layer 3 sublayers (RR sublayers 308a, 308b), the protocol stacks 306a, 306b may also include data link layers 310a, 310b, which may be part of Layer 2 in a GSM or LTE signaling protocol. The data link layers 310a, 310b may provide functions to handle incoming and outgoing data across the network, such as dividing output data into data frames and analyzing incoming data to ensure the data has been successfully received In some embodiments, each data link layer 310a, 310b may contain various sublayers, such as a media access control (MAC) sublayer, a radio link control (RLC) sublayer, and a packet data convergence protocol (PDCP) sublayer, each of which form logical connections terminating at the access network. In various embodiments, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ. In the uplink, the MAC sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

Residing below the data link layers 310a, 310b, the protocol stacks 306a, 306b may also include physical layers 312a, 312b, which may establish connections over the air interface and manage network resources for the mobile communication device 200. In various embodiments, the physical layers 312a, 312b may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stacks 306a, 306b provide functions to transmit data through physical media, the software architecture 300 may further include at least one host layer 314 to provide data transfer services to various applications in the mobile communication device 200. In other embodiments, application-specific functions provided by the at least one host layer 314 may provide an interface between the protocol stacks 306a, 306b and the general purpose processor 206. In some embodiments, the protocol stacks 306a, 306b may each include one or more higher logical layers (e.g., transport, session, presentation, application, etc.) that provide host layer functions. For example, in some embodiments, the software architecture 300 may include a network layer (e.g., Internet Protocol (IP) layer) in which a logical connection terminates at a gateway. In some embodiments, the software architecture 300 may include an application layer in which a logical connection terminates at another device (e.g., end user device, server, etc.). In some embodiments, the software architecture 300 may further include in the AS 304 a hardware interface 316 between the physical layers 312a, 312b and the communication hardware (e.g., one or more RF resource).

In various embodiments, the protocol stacks 306a, 306b of the layered software architecture may be implemented to allow modem operation using information provisioned on an eUICC or multiple SIMs. Therefore, a protocol stack that may be executed by a baseband-modem processor is interchangeably referred to herein as a modem stack.

As described, the modem stacks in various embodiments may support any of a variety of current and/or future protocols for wireless communications. For examples, the modem stacks in various embodiments may support networks using radio access technologies described in 3GPP standards (e.g., GSM, UMTS, LTE, etc.), 3GPP2 standards (e.g., 1×RTT/CDMA2000, evolution data optimized (EV-DO), etc.) and/or Institute of Electrical and Electronics Engineers (IEEE) standards (WiMAX, Wi-Fi, etc.).

The eUICC 204 may support multiple mobile network operator profiles, or subscription profiles. For example, a user may download multiple profiles onto the eUICC 204. Each profile may store static SIM information that is used to support a subscription with one or more mobile telephony networks. Thus, the eUICC 204 may play the role of multiple SIMs, because each SIM supports one profile.

In various examples, the mobile communication device 200 may be configured to locally cache the subscription profiles of each subscription stored on an eUICC. The profiles may be cached in the memory 214, part of which may be designated memory for the modem. For example, the lower layers of the baseband modem processor 216 (e.g., the physical layers 312a, 312b, the data link layers 310a, 310b) may maintain active stacks for each subscription profile. Upon startup of the mobile communication device 200, the mobile communication device 200 may sequentially perform attach procedures for each subscription supported by the eUICC 204. After performing the attach procedure for each subscription and registering each subscription with its respective mobile telephony network, the profile for the subscription may be locally cached on the mobile communication device 200 (e.g., stored in the modem stack). The mobile communication device may then deactivate the profile on the eUICC 204 before performing attach procedures for the next subscription. However, the mobile communication device 200 does not perform an IMSI detach procedure with a subscription's respective network when the subscription is deactivated on the eUICC 204. This way, the network does not know that the subscription has detached and so the network may continue to transmit paging indicators for the subscription. The mobile communication device 200 may be able to decode received paging indicators using the locally cached profiles of each subscription. Thus, even if the paging indicator is directed toward a subscription that is not active on the eUICC 204, the mobile communication device 200 may still be able to decode the paging indicator using the cached profile of the inactive subscription stored in local memory.

After all of the profiles for the subscriptions supported by the eUICC 204 have been cached, the mobile communication device 200 may select a subscription to activate during normal operation. The active subscription may be the designated data subscription, which is polled frequently by its respective network. The mobile communication device 200 may continue to receive and decode paging messages for each subscription supported by the eUICC 204 using the locally cached profiles because none of the subscriptions detached from their respective networks.

When the mobile communication device 200 receives a page directed to an inactive subscription, the mobile communication device 200 may activate the subscription of the eUICC 204. The subscription may then authenticate with the network and receive the call. The subscription that was active is deactivated, but no IMSI detach procedure is performed with its respective network. This allows the mobile communication device to continue receiving paging indicators and other messages for the subscription as its respective network still considers it active.

If the user initiates an outgoing call (voice or data) on an inactive subscription, the network usually sends an authentication request to the mobile communication device 200. The mobile communication device 200 may switch from the active subscription to the inactive subscription so that the inactive subscription may become active, and receive and process the authentication request. When activating the inactive subscription, the currently active subscription does not perform an IMSI detach procedure with its respective network. This allows the mobile communication device to continue receiving paging indicators and other messages for the subscription as its respective network still considers it active.

Figure 4:
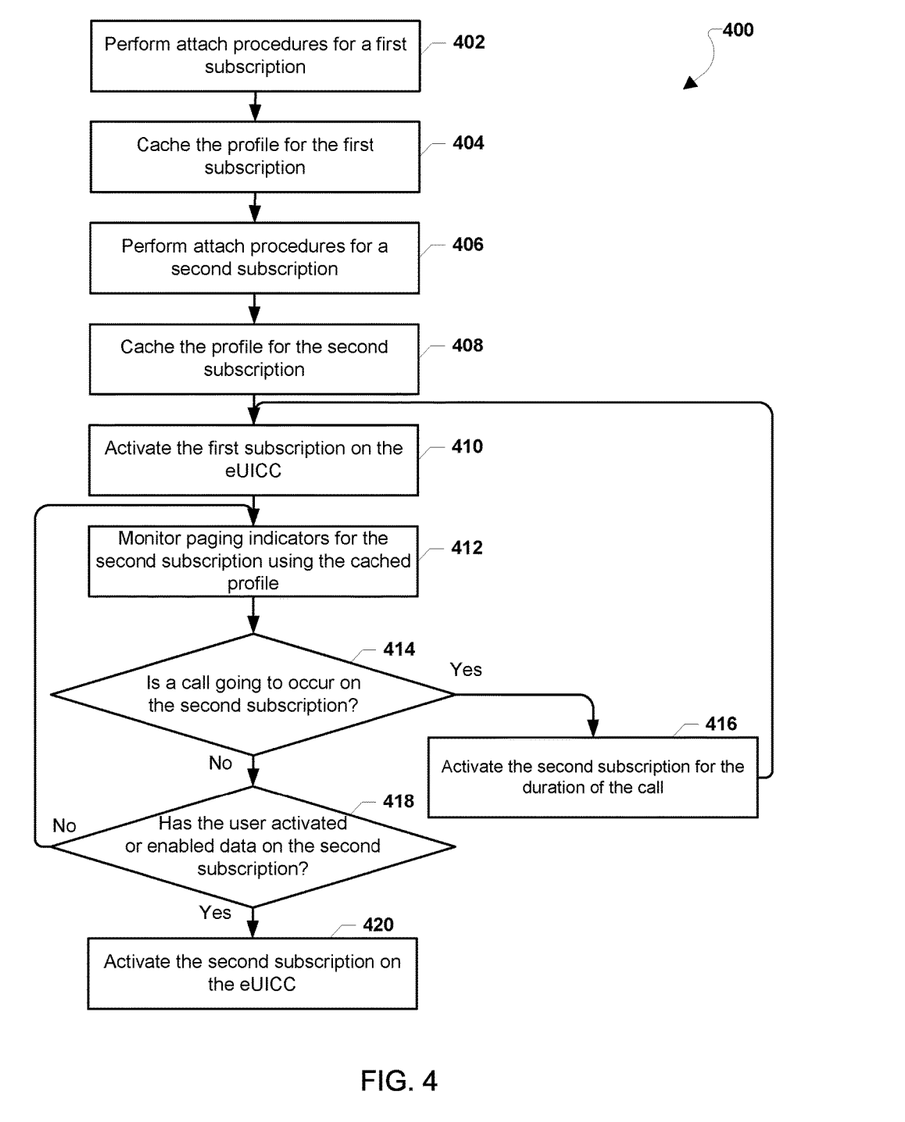
FIG. 4 is a process flow diagram illustrating a method for obtaining network services on a mobile communication device according to various examples.

FIG. 4 illustrates a method 400 obtaining network services on a mobile communication device according to various examples. The method 400 may be implemented in a processor (e.g., the general processor 206, the baseband modem processor 216, a separate controller, and/or the like) of a mobile communication device (such as the mobile communication devices 110, 120, and 200). The mobile communication device may include an eUICC that stores multiple profiles, each supporting a subscription.

In block 402, the processor may perform an attach procedure for a first subscription supported by the eUICC. This may occur upon startup of the mobile communication device. The attach procedure may include activating the first subscription of the eUICC and connecting with a first mobile telephony network associated with the first subscription to register with the first network. The eUICC may store a profile for the first subscription, which may include static SIM information used to authenticate and communicate with the first network. In block 404, the processor may cache the profile corresponding to the first subscription in a local memory on the mobile communication device, for example a stack managed by a modem on the mobile communication device. All or a portion of the profile for the first subscription information stored in the eUICC may be cached.

In block 406, the processor may perform an attach procedure for a second subscription supported by the eUICC. The attach procedure may include switching the active subscription of the eUICC from the first subscription to the second subscription and connecting with a second mobile telephony network to register with the second network. When the first subscription is deactivated, the processor does not perform a detach procedure and thus the first network may still transmit pages and other messages to the first subscription. The eUICC may store a profile for the second subscription, which may include static SIM information used to authenticate and communicate with the second network.

In block 408, the processor may cache the profile corresponding to the second subscription in a local memory on the mobile communication device, for example a stack managed by a modem on the mobile communication device. All or a portion of the profile for the second subscription information in the eUICC may be cached.

If the eUICC stores additional profiles for additional subscriptions, the process may sequentially perform attach procedures and cache the profile for each additional subscription as described for blocks 406 and 408.

In block 410, the processor may activate one of the cached subscriptions, such as reactivate the first subscription attached in block 402. For ease of reference, the subscription that is active is referred to as the first subscription while the subscription that was attached but now inactive is referred to as the second subscription hereafter. However, either (or any) of the subscriptions supported by the eUICC that have been attached and cached may be active and thus referred to as the first subscription. As an example, the first subscription may be the designated data subscription. The user may use the first subscription to initiate voice or data calls, and receive pages and calls from the first network.

In block 412, the processor may monitor paging indicators for the second subscription using the cached profile of the second subscription. The second network may continue to send paging notifications directed to the second subscription because no detach procedure was performed and thus the second subscription is still registered with the second network. The mobile communication device may utilize the cached profile of the second subscription to decode the page. Thus, even though the second subscription is not active on the eUICC, the processor may use the locally cached profile to receive and decode paging indicators for the second subscription.

In determination block 414, the processor may determine whether a call is going to occur on the second subscription based on the paging indicators. For example, the processor may receive and decode a page from the second network indicating an incoming call on the second subscription. In some embodiments, the processor may determine that a call is about to occur on the second subscription when the user interacts with a user interface to initiate an outgoing call on that subscription.

In response to determining that a call is going to occur on the second subscription (i.e., determination block 414="Yes"), the processor may activate the second subscription for the duration of the call in block 416. The activation may include switching from the first subscription to the second subscription of the eUICC and responding to an authentication request transmitted from the second network. Once the second subscription is authenticated, the call may commence. In block 416, the first subscription does not perform a detach procedure with the first network when it becomes inactive.

After the call ends, the processor may reactivate the first subscription in block 410. The activation may include switching from the profile of the second subscription to the profile of the first subscription using information on the eUICC that has been cached in memory. In block 410, the second subscription does not perform a detach procedure with the second network when it becomes inactive.

In response to determining that a call is not going to occur on the second subscription (i.e., determination block 414="No"), the processor may determine whether the user has activated or enabled data on the second subscription in determination block 418. For example, the user may select the second subscription to make a voice or data call, or enable the second subscription as the DDS. In response to determining that the user has not activated or enabled data on the second subscription (i.e., determination block 418="No"), the processor may continue to monitor pages for the second subscription using the cached profile of the second subscription in block 412.

In response to determining that the user has activated or enabled data on the second subscription (i.e., determination block 418="Yes"), the processor may activate the second subscription in block 420. The activation performed in block 420 may include deactivating the first subscription and activating the second subscription without performing a detach procedure with the first network when it becomes inactive. The processor may then return to block 412, except that the second subscription is now the active subscription and the first subscription is the inactive subscription. In this manner, the method 400 provides a way to enable multiple subscription service on a single eUICC.

Figure 5:
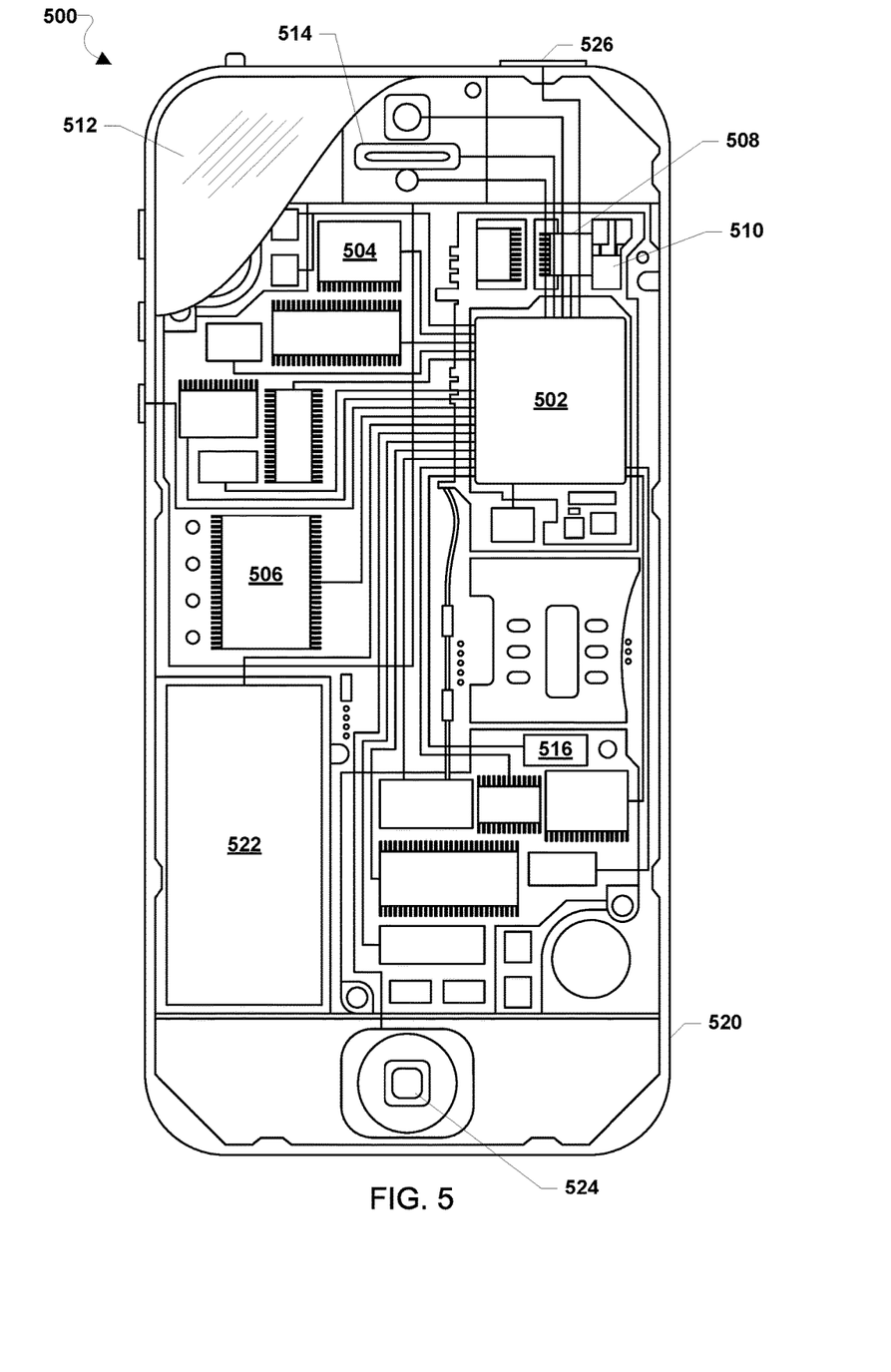
FIG. 5 is a component block diagram of a mobile communication device suitable for implementing some example methods.

Various examples may be implemented in any of a variety of mobile communication devices, an example of which (e.g., mobile communication device 500) is illustrated in FIG. 5. The mobile communication device 500 may be similar to the mobile communication devices 110, 120, 200 and may implement the method 400.

The mobile communication device 500 may include a processor 502 coupled to a touchscreen controller 504 and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the mobile communication device 500 need not have touch screen capability.

The mobile communication device 500 may have one or more cellular network transceivers 508 coupled to the processor 502 and to one or more antennas 510 and configured for sending and receiving cellular communications. The one or more transceivers 508 and the one or more antennas 510 may be used with the above-mentioned circuitry to implement various example methods. The mobile communication device 500 may include one or more eUICC or SIM cards 516 coupled to the one or more transceivers 508 and/or the processor 502 and may be configured as described above.

The mobile communication device 500 may also include speakers 514 for providing audio outputs. The mobile communication device 500 may also include a housing 520, constructed of a plastic, metal, or a combination of materials, for containing all or some of the components discussed herein. The mobile communication device 500 may include a power source 522 coupled to the processor 502, such as a disposable or rechargeable battery. The rechargeable battery may also be coupled to the peripheral device connection port to receive a charging current from a source external to the mobile communication device 500. The mobile communication device 500 may also include a physical button 524 for receiving user inputs. The mobile communication device 500 may also include a power button 526 for turning the mobile communication device 500 on and off.

The foregoing method descriptions and the process flow diagrams are provided merely as illustrative examples and are not intended to require or imply that the steps of various examples are performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the written description. Thus, the present disclosure is not intended to be limited to the examples shown herein but is to be accorded the widest scope consistent with the following claims and the principles and novel features disclosed herein.

What is claimed is:

1. A method for obtaining network services on a mobile communication device, comprising:
    attaching the mobile communication device to a first network associated with a first subscription supported by a first profile stored on an embedded universal integrated circuit card (eUICC) on the mobile communication device using a receive circuit;
    caching, in memory on the mobile communication device, the first profile corresponding to the first subscription;
    deactivating the first subscription of the eUICC on the mobile communication device without detaching from the first network such that communications are still sent to the mobile communication device via the first network and the receive circuit;
    caching, in memory on the mobile communication device, a second profile stored on the eUICC corresponding to a second subscription;
    activating the first subscription of the eUICC; and
    monitoring for paging indicators directed to the second subscription of the eUICC utilizing the cached second profile via the receive circuit used for the first profile corresponding to the first subscription.

2. The method of claim 1, further comprising:
    determining whether a call is going to occur on the second subscription based on the paging indicators; and
    activating the second subscription of the eUICC for a duration of the call in response to determining that a call is going to occur on the second subscription.

3. The method of claim 2, further comprising:
    activating the first subscription of the eUICC after the call ends.

4. The method of claim 2, wherein the first subscription is not detached from the first network when activating the second subscription of the eUICC.

5. The method of claim 2, wherein determining whether a call is going to occur on the second subscription is further based on whether a user has initiated a call on the second subscription.

6. The method of claim 1, further comprising:
    attaching the mobile communication device to a second network associated with the second subscription.

7. The method of claim 1, further comprising:
    determining whether a user has activated the second subscription or enabled data on the second subscription; and
    activating the second subscription of the eUICC in response to determining that the user has activated the second subscription or enabled data on the second subscription.

8. The method of claim 1, wherein the first subscription is a designated data subscription.

9. The method of claim 1, wherein the second subscription is not detached from a second network when activating the first subscription of the eUICC.

10. The method of claim 1, wherein the first profile and the second profile are cached in a local memory on the mobile communication device.

11. The method of claim 1, wherein monitoring for paging indicators directed to the second subscription utilizing the cached second profile comprises receiving and decoding the paging indicators utilizing the cached second profile.

12. A mobile communication device comprising:
a memory;
a radio frequency (RF) resource; and
a processor coupled to the memory and the RF resource, configured to connect to an embedded universal integrated circuit card (eUICC) storing a first profile and a second profile, and configured to:
attach the mobile communication device to a first network associated with a first subscription supported by the first profile stored on the eUICC using a receive circuit;
cache, in the memory, the first profile corresponding to the first subscription;
deactivate the first subscription of the eUICC on the mobile communication device without detaching from the first network such that communications are still sent to the mobile communication device via the first network and the receive circuit;
cache, in the memory, the second profile stored on the eUICC corresponding to a second subscription;
activate the first subscription of the eUICC; and
monitor for paging indicators directed to the second subscription of the eUICC utilizing the cached second profile via the receive circuit used for the first profile corresponding to the first subscription.

13. The mobile communication device of claim 12, wherein the processor is further configured to:
determine whether a call is going to occur on the second subscription based on the paging indicators; and
activate the second subscription of the eUICC for a duration of the call in response to determining that a call is going to occur on the second subscription.

14. The mobile communication device of claim 13, wherein the processor is further configured to:
activate the first subscription of the eUICC after the call ends.

15. The mobile communication device of claim 13, wherein the first subscription is not detached from the first network when activating the second subscription of the eUICC.

16. The mobile communication device of claim 13, wherein determining whether a call is going to occur on the second subscription is further based on whether a user has initiated a call on the second subscription.

17. The mobile communication device of claim 12, wherein the processor is further configured to:
attach the mobile communication device to a second network associated with the second subscription.

18. The mobile communication device of claim 12, wherein the processor is further configured to:
determine whether a user has activated the second subscription or enabled data on the second subscription; and
activate the second subscription of the eUICC in response to determining that the user has activated the second subscription or enabled data on the second subscription.

19. The mobile communication device of claim 12, wherein the first subscription is a designated data subscription.

20. The mobile communication device of claim 12, wherein the second subscription is not detached from a second network when activating the first subscription of the eUICC.

21. The mobile communication device of claim 12, wherein the first profile and the second profile are cached in a local memory on the mobile communication device.

22. The mobile communication device of claim 12, wherein the processor is further configured to monitor for paging indicators directed to the second subscription utilizing the cached second profile by receiving and decoding the paging indicators utilizing the cached second profile.

23. A non-transitory computer readable storage medium having stored thereon processor-executable software instructions configured to cause a processor of a mobile communication device to perform operations comprising:
attaching the mobile communication device to a first network associated with a first subscription supported by a first profile stored on an embedded universal integrated circuit card (eUICC) on the mobile communication device using a receive circuit;
caching, in memory on the mobile communication device, the first profile corresponding to the first subscription;
deactivating the first subscription of the eUICC on the mobile communication device without detaching from the first network such that communications are still sent to the mobile communication device via the first network and the receive circuit;
caching, in memory on the mobile communication device, a second profile stored on the eUICC corresponding to a second subscription;
activating the first subscription of the eUICC; and
monitoring for paging indicators directed to the second subscription of the eUICC utilizing the cached second profile via the receive circuit used for the first profile corresponding to the first subscription.

24. The non-transitory computer readable storage medium of claim 23, wherein the stored processor-executable instructions are configured to cause the processor of the mobile communication device to perform operations further comprising:
determining whether a call is going to occur on the second subscription based on the paging indicators; and
activating the second subscription of the eUICC for a duration of the call in response to determining that a call is going to occur on the second subscription.

25. The non-transitory computer readable storage medium of claim 24, wherein the stored processor-executable instructions are configured to cause the processor of the mobile communication device to perform operations further comprising:
activating the first subscription of the eUICC after the call ends.

26. The non-transitory computer readable storage medium of claim 24, wherein the first subscription is not detached from the first network when activating the second subscription of the eUICC.

27. The non-transitory computer readable storage medium of claim 24, wherein determining whether a call is going to occur on the second subscription is further based on whether a user has initiated a call on the second subscription.

28. The non-transitory computer readable storage medium of claim 23, wherein the stored processor-executable instructions are configured to cause the processor of the mobile communication device to perform operations further comprising, further comprising:
attaching the mobile communication device to a second network associated with the second subscription.

29. The non-transitory computer readable storage medium of claim 23, wherein the stored processor-executable instructions are configured to cause the processor of the mobile communication device to perform operations further comprising, further comprising:

determining whether a user has activated the second subscription or enabled data on the second subscription; and activating the second subscription of the eUICC in response to determining that the user has activated the second subscription or enabled data on the second subscription.

30. The non-transitory computer readable storage medium of claim 23, wherein the first subscription is a designated data subscription.

31. The non-transitory computer readable storage medium of claim 23, wherein the second subscription is not detached from a second network when activating the first subscription of the eUICC.

32. The non-transitory computer readable storage medium of claim 23, wherein the first profile and the second profile are cached in a local memory on the mobile communication device.

33. The non-transitory computer readable storage medium of claim 23, wherein the stored processor-executable instructions are configured to cause the processor of the mobile communication device to perform operations such that monitoring for paging indicators directed to the second subscription utilizing the cached second profile comprises:

receiving and decoding the paging indicators utilizing the cached second profile.

34. A mobile communication device, comprising:

means for attaching the mobile communication device to a first network associated with a first subscription supported by a first profile stored on an embedded universal integrated circuit card (eUICC) on the mobile communication device;

means for caching the first profile corresponding to the first subscription;

means for deactivating the first subscription of the eUICC on the mobile communication device without detaching from the first network such that communications are still sent to the mobile communication device via the first network and the means for attaching the mobile communication device to a first network associated with a first subscription supported by a first profile stored on an embedded universal integrated circuit card (eUICC) on the mobile communication device;

means for caching a second profile stored on the eUICC corresponding to a second subscription;

means for activating the first subscription of the eUICC; and means for monitoring for paging indicators directed to the second subscription of the eUICC utilizing the cached second profile via the means for attaching the mobile communication device to a first network associated with a first subscription supported by a first profile stored on an embedded universal integrated circuit card (eUICC) on the mobile communication device.

35. The mobile communication device of claim 34, further comprising:

means for determining whether a call is going to occur on the second subscription based on the paging indicators; and means for activating the second subscription of the eUICC for a duration of the call in response to determining that a call is going to occur on the second subscription.

36. The mobile communication device of claim 35, further comprising:

means for activating the first subscription of the eUICC after the call ends.

37. The mobile communication device of claim 35, wherein the first subscription is not detached from the first network when activating the second subscription of the eUICC.

38. The mobile communication device of claim 35, wherein means for determining whether a call is going to occur on the second subscription is further based on whether a user has initiated a call on the second subscription.

39. The mobile communication device of claim 34, further comprising:

means for attaching the mobile communication device to a second network associated with the second subscription.

40. The mobile communication device of claim 34, further comprising:

means for determining whether a user has activated the second subscription or enabled data on the second subscription; and means for activating the second subscription of the eUICC in response to determining that the user has activated the second subscription or enabled data on the second subscription.

41. The mobile communication device of claim 34, wherein the first subscription is a designated data subscription.

42. The mobile communication device of claim 34, wherein the second subscription is not detached from a second network when activating the first subscription of the eUICC.

43. The mobile communication device of claim 34, wherein the first profile and the second profile are cached in a local memory on the mobile communication device.

44. The mobile communication device of claim 34, wherein means for monitoring for paging indicators directed to the second subscription utilizing the cached second profile comprises means for receiving and decoding the paging indicators utilizing the cached second profile.

* * * * *